United States Patent
Liang et al.

(10) Patent No.: US 9,922,388 B2
(45) Date of Patent: Mar. 20, 2018

(54) SYSTEMS AND METHODS FOR MULTIMEDIA PROCESSING

(71) Applicant: Tencent Technology (Shenzhen) Company Limited, Shenzhen (CN)

(72) Inventors: Zhu Liang, Shenzhen (CN); Dali Chen, Shenzhen (CN); Jinkai Ouyang, Shenzhen (CN); Mingwei Zhang, Shenzhen (CN); Xian Liu, Shenzhen (CN); Jiachao Xian, Shenzhen (CN); Bohan Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 368 days.

(21) Appl. No.: 14/219,313

(22) Filed: Mar. 19, 2014

(65) Prior Publication Data
US 2014/0369549 A1    Dec. 18, 2014

Related U.S. Application Data

(63) Continuation of application No. PCT/CN2013/088994, filed on Dec. 10, 2013.

(30) Foreign Application Priority Data

Jun. 14, 2013   (CN) .......................... 2013 1 0236609

(51) Int. Cl.
*G06K 9/00* (2006.01)
*G06T 1/00* (2006.01)
(Continued)

(52) U.S. Cl.
CPC ............ *G06T 1/0021* (2013.01); *G06F 21/10* (2013.01); *G06F 2221/0733* (2013.01); *H04N 21/8358* (2013.01)

(58) Field of Classification Search
None
See application file for complete search history.

(56) References Cited

U.S. PATENT DOCUMENTS 5,465,160 A    11/1995 Kamo et al.
5,751,924 A     5/1998 Hamada et al.
(Continued)

FOREIGN PATENT DOCUMENTS

CN    101325702 A    12/2008
CN    102377933 A     3/2012
(Continued)

OTHER PUBLICATIONS

Zhou, Wu, Xinwen Zhang, and Xuxian Jiang. "Appink: watermarking android apps for repackaging deterrence." Proceedings of the 8th ACM SIGSAC symposium on Information, computer and communications security. ACM, May 2013.*

(Continued)

*Primary Examiner* — Sean Conner
(74) *Attorney, Agent, or Firm* — Jones Day

(57) ABSTRACT

Systems and methods are provided for multimedia processing. For example, an encoded file is acquired; the encoded file is parsed to obtain application-indication information and watermark-indication information associated with the encoded file; a multimedia-recording application associated with the application-indication information is called; watermark information is generated based on at least the watermark-indication information; the watermark information displayed on a recording interface of the multimedia-recording application; and in response to multimedia information being generated on the recording interface of the multimedia-recording application, the watermark information and the multimedia information is integrated.

15 Claims, 8 Drawing Sheets

(51) Int. Cl.
    *G06F 21/10*     (2013.01)
    *H04N 21/8358*     (2011.01)

(56) References Cited

U.S. PATENT DOCUMENTS

| | | | |
|---|---|---|---|
| 5,963,968 | A | 10/1999 | Warmus et al. |
| 6,332,149 | B1 | 12/2001 | Warmus et al. |
| 2002/0018233 | A1* | 2/2002 | Mori ................... H04N 1/00238 |
| | | | 358/1.15 |
| 2002/0033844 | A1* | 3/2002 | Levy ....................... G06F 21/10 |
| | | | 715/744 |
| 2008/0110991 | A1* | 5/2008 | Bedingfield ....... H04N 21/4223 |
| | | | 235/462.1 |
| 2015/0199197 | A1* | 7/2015 | Maes ......................... G06F 8/71 |
| | | | 717/122 |

FOREIGN PATENT DOCUMENTS

| | | | |
|---|---|---|---|
| CN | 102722900 | A | 10/2012 |
| CN | 102929595 | A | 2/2013 |

OTHER PUBLICATIONS

Patent Cooperation Treaty, International Search Report and Written Opinion of the International Searching Authority, dated Feb. 27, 2014, in PCT/CN2013/088994.

Patent Cooperation Treaty, International Preliminary Report on Patentability, dated Dec. 15, 2015, in PCT/CN2013/088994.

* cited by examiner

SYSTEMS AND METHODS FOR MULTIMEDIA PROCESSING

CROSS-REFERENCES TO RELATED APPLICATIONS

This application is a continuation of International Application No. PCT/CN2013/088994, with an international filing date of Dec. 10, 2013, now pending, which claims priority to Chinese Patent Application No. 201310236609.4, filed Jun. 14, 2013, both applications being incorporated by reference herein for all purposes.

TECHNOLOGY FIELD

Certain embodiments of the present invention are directed to computer technology. More particularly, some embodiments of the invention provide systems and methods for information processing. Merely by way of example, some embodiments of the invention have been applied to multimedia information. But it would be recognized that the invention has a much broader range of applicability.

BACKGROUND

With development of the Internet technology, multimedia information is widely used. How to ensure the security of using multimedia information remains a problem to be solved. The conventional technology includes: adding watermark information to multimedia information to avoid unauthorized duplication of the multimedia information to ensure the security of using the multimedia information. Specifically, a user often needs to manually start a multimedia-recording application. Then, the user may use the multimedia-recording application to complete a recording operation to generate multimedia information. The generated multimedia information is imported into a dedicated tool for watermarking. However, the above-noted conventional technology often includes complicated processes and reduces efficiency and intelligence of multimedia processing.

Hence it is highly desirable to improve the techniques for multimedia processing.

SUMMARY

According to one embodiment, a method is provided for multimedia processing. For example, an encoded file is acquired; the encoded file is parsed to obtain application-indication information and watermark-indication information associated with the encoded file; a multimedia-recording application associated with the application-indication information is called; watermark information is generated based on at least the watermark-indication information; the watermark information displayed on a recording interface of the multimedia-recording application; and in response to multimedia information being generated on the recording interface of the multimedia-recording application, the watermark information and the multimedia information is integrated.

According to another embodiment, a client includes: a decoding module, an application-calling module, a watermark-generation module, a preview module and a processing module. The decoding module is configured to acquire and parse an encoded file to obtain application-indication information and watermark-indication information associated with the encoded file. The application-calling module is configured to call a multimedia-recording application associated with the application-indication information. The watermark-generation module is configured to generate watermark information based on at least the watermark-indication information. The preview module is configured to display the watermark information on a recording interface of the multimedia-recording application. The processing module is configured to, in response to multimedia information being generated on the recording interface of the multimedia-recording application, integrate the watermark information and the multimedia information.

According to yet another embodiment, a terminal includes a client. The client includes: a decoding module, an application-calling module, a watermark-generation module, a preview module and a processing module. The decoding module is configured to acquire and parse an encoded file to obtain application-indication information and watermark-indication information associated with the encoded file. The application-calling module is configured to call a multimedia-recording application associated with the application-indication information. The watermark-generation module is configured to generate watermark information based on at least the watermark-indication information. The preview module is configured to display the watermark information on a recording interface of the multimedia-recording application. The processing module is configured to, in response to multimedia information being generated on the recording interface of the multimedia-recording application, integrate the watermark information and the multimedia information.

According to yet another embodiment, a non-transitory computer readable storage medium includes programming instructions for multimedia processing. The programming instructions are configured to cause one or more data processors to execute certain operations. For example, an encoded file is acquired; the encoded file is parsed to obtain application-indication information and watermark-indication information associated with the encoded file; a multimedia-recording application associated with the application-indication information is called; watermark information is generated based on at least the watermark-indication information the watermark information displayed on a recording interface of the multimedia-recording application; and in response to multimedia information being generated on the recording interface of the multimedia-recording application, the watermark information and the multimedia information is integrated.

For example, the systems and methods described herein can be configured to integrate multimedia information (e.g., graphic information, video information, etc.) with watermark information to enable differentiation of true and false multimedia information and copyright protection. As an example, the watermark information in the multimedia information does not affect the visual effect and integrity of the multimedia information. In another example, the systems and methods described herein can be configured to acquire and parse an encoded file that contains application-indication information and watermark-indication information, automatically call a multimedia-recording application according to the application-indication information, and automatically generate watermark information according to the watermark-indication information to integrate the watermark information and the multimedia information. The entire multimedia process is automatically executed by a client so as to simplify user operations and improve efficiency and intelligence for multimedia processing, in certain embodiments.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
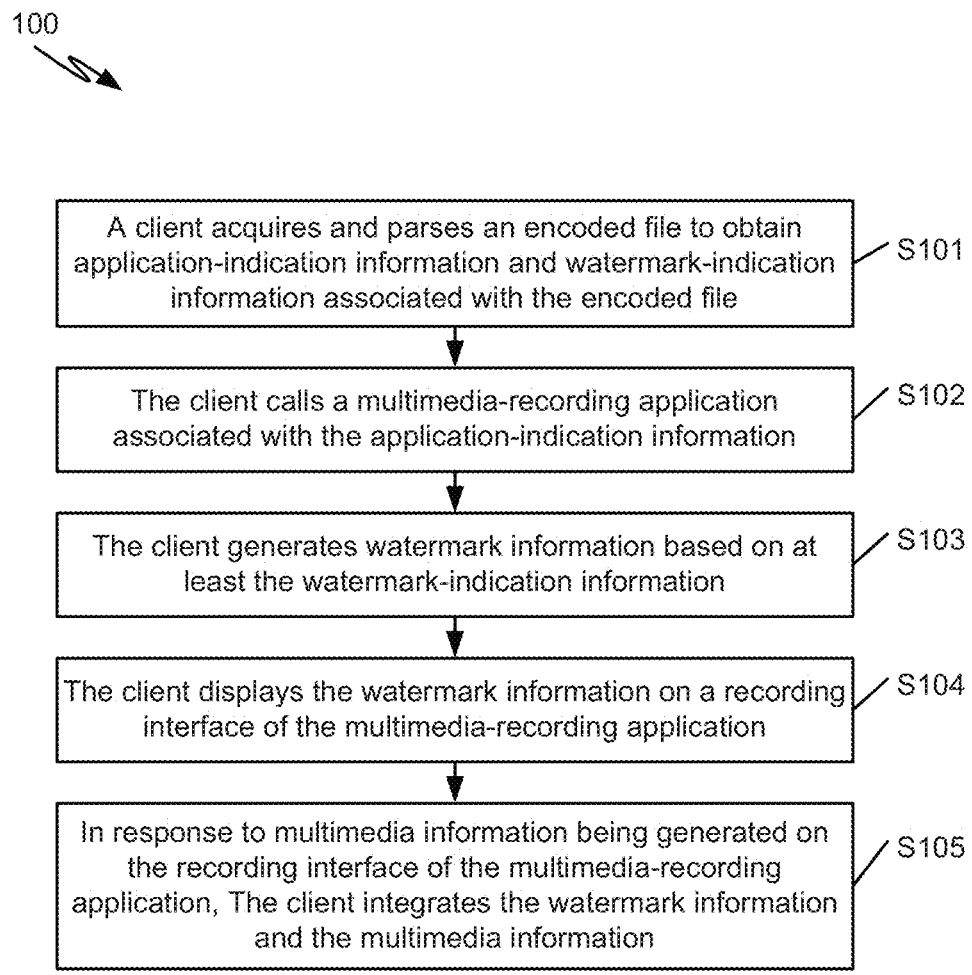
FIG. 1 is a simplified diagram showing a method for multimedia processing according to one embodiment of the present invention.

FIG. 1 is a simplified diagram showing a method for multimedia processing according to one embodiment of the present invention. This diagram is merely an example, which should not unduly limit the scope of the claims. One of ordinary skill in the art would recognize many variations, alternatives, and modifications. The method 100 includes at least the processes S101-S105.

According to one embodiment, during the process S101, a client acquires and parses an encoded file to obtain application-indication information and watermark-indication information carried by the encoded file. For example, the client corresponds to a client module in a terminal, such as an instant messaging client, a social-networking-services (SNS) client, etc. In another example, the terminal includes: a personal computer, a tablet, a cell phone, a smart phone, a laptop, etc. In yet another example, the encoded file includes a text encoded file, e.g., a binary encoded file. In yet another example, the encoded file includes a graphic encoded file, e.g., a two-dimensional barcode. In yet another example, the application-indication information includes: address information of a multimedia-recording application and control information for calling the multimedia-recording application. In yet another example, the watermark-indication information includes: topic information and identification information of a watermark template. During the process S101, the client can use a two-dimensional barcode tool to scan and parse a two-dimensional barcode and obtain the application-indication information and the watermark-indication information carried by the two-dimensional barcode, in some embodiments.

According to another embodiment, during the process S102, the client calls a multimedia-recording application indicated by the application-indication information. For example, the multimedia-recording application is used to photograph or record the multimedia information. As an example, the multimedia-recording application includes: a photographing application and/or a recording application. As another example, the multimedia information includes: image information or video information, in another example, the multimedia-recording application includes a multimedia-recording application in the client or an independent multimedia application of the terminal where the client is mounted.

According to yet another embodiment, during the process S103, the client generates watermark information according to the watermark-indication information. For example, the client generates watermark information by using the topic information contained in the watermark-indication information and the identification information of the watermark template. In another example, during the process S104, the client displays the watermark information on a recording interface of the multimedia-recording application. During the process S104, the client displays the watermark information on the recording interface of the multimedia-recording application to provide a preview of the watermark so that the user can preview, on the recording interface of the multimedia-recording application, the multimedia information which is to be recorded and contains the watermark information, in certain embodiments.

According to yet another embodiment, during the process S105, when multimedia information is generated on the recording interface of the multimedia-recording application, the client integrates the watermark information and the multimedia information. For example, the multimedia information is generated on the recording interface of the multimedia-recording application after the multimedia-recording application completes the recording operation. In another example, when the multimedia application is used for photographing, the recording interface of the multimedia-recording application generates information related to the photos. In yet another example, when the multimedia application is used for videotaping, the recording interface of the multimedia-recording application generates information related to the videos. In yet another example, the client can use multimedia integration technology to integrate the watermark information and the multimedia information. As an example, image processing software (e.g., Adobe Photoshop) may be used to overlay the watermark information on the multimedia information. As another example, the multimedia information contains the watermark information after integration.

Figure 2:
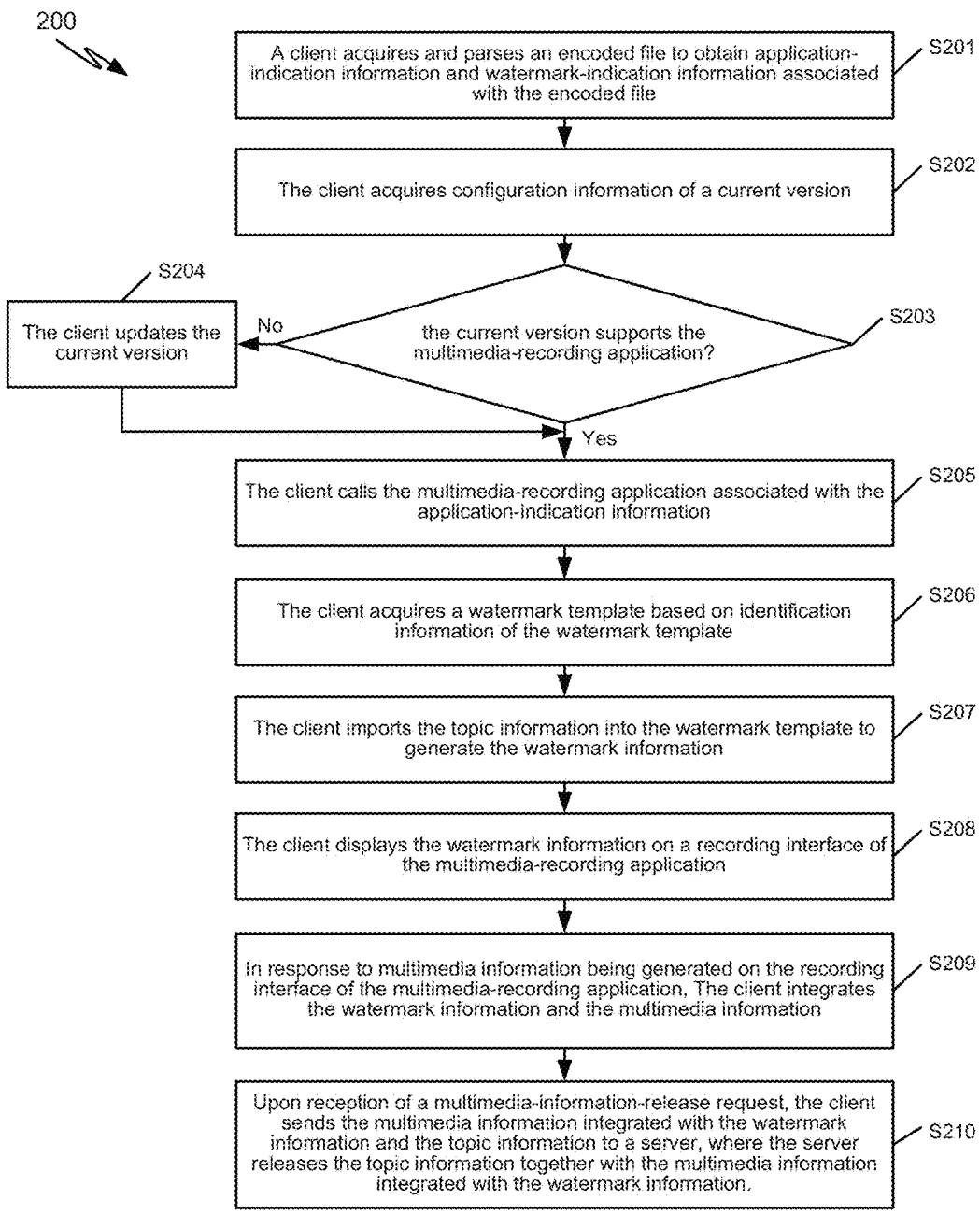
FIG. 2 is a simplified diagram showing a method for multimedia processing according to another embodiment of the present invention.

FIG. 2 is a simplified diagram showing a method for multimedia processing according to another embodiment of the present invention. This diagram is merely an example, which should not unduly limit the scope of the claims. One of ordinary skill in the art would recognize many variations, alternatives, and modifications. The method 200 includes at least the processes S201-S210.

According to one embodiment, during the process S201, a client acquires and parses an encoded file to obtain application-indication information and watermark-indication information carried by the encoded file. For example, the application-indication information includes: address information of the multimedia-recording application and control information for calling the multimedia-recording application. In another example, the watermark-indication information includes: topic information and identification information of a watermark template. The process S201 is the same as the process S101 as shown in FIG. 1, in some embodiments.

According to another embodiment, during the process S202, the client acquires configuration information of a current version of the client. For example, the configuration information of the current version includes: a version number, an overview of features, supported applications and an application environment of the current version. In another example, during the process S203, the client determines if the current version supports the multimedia-recording application according to the configuration information of the current version. In yet another example, if the current version supports the multimedia-recording application, it indicates that the current version of the client can call the multimedia-recording application and then the process S205 is executed. Otherwise, it indicates that the current version of the client cannot directly call the multimedia-recording application, and then the process S204 is executed.

According to yet another embodiment, during the process S204, the client updates the current version. For example, the client can check the latest version and update to the latest version when the client is connected to the Internet. In another example, the latest version of the client can support the multimedia-recording application and call the multimedia-recording application. In yet another example, during the process S205, the client calls a multimedia-recording application indicated by the application-indication information. The process 205 is the same as the process S102 as shown in FIG. 1, in some embodiments.

In one embodiment, during the process S206, the client acquires the watermark template identified by the identification information of the watermark template. For example, the identification information of the watermark template includes an ID of the watermark template which uniquely identifies a watermark template. In another example, the client can acquire the identified watermark template from the server according to the identification information of the watermark template on a real-time basis. In yet another example, the client can acquire from the server at least one watermark template in advance and then locally acquire the identified watermark template according to the identification information of the watermark template. In yet another example, during the process S207, the client imports the topic information into the watermark template to generate the watermark information. The processes S206-S207 are included in the process S103 as shown in FIG. 1, in some embodiments.

In another embodiment, during the process S208, the client displays the watermark information on a recording interface of the multimedia-recording application. For example, during the process S209, when multimedia information is generated on the recording interface of the multimedia-recording application, the client integrates the watermark information and the multimedia information. The processes S208 and S209 are the same as the processes S104 and S105 as shown in FIG. 1, in some embodiments.

In yet another embodiment, during the process S210, the client sends the multimedia information integrated with the watermark information and the topic information to a server upon receipt of a multimedia-information-release request so that the server releases the topic information together with the multimedia information integrated with the watermark information. For example, the release of the topic information includes: 1) the server releases the topic information according to a release mode set by the user (e.g., releasing the topic information regarding the user's friends on an SNS site); or 2) the server releases the topic information on a dedicated page (e.g., releasing the topic information about "Ya'an" on the dedicated page which includes all released information related to the topic "Ya'an." During the process S210, when the multimedia information is released, the topic information that matches with the watermark information is also released so as to expand release modes of the topic information, in some embodiments. For example, the user can view and manage the multimedia information and the topic information through the client after the multimedia information and the topic information is released.

Figure 3A:
FIG. 3(A) is a simplified diagram showing a two-dimensional barcode according to one embodiment of the present invention.

FIG. 3(A) is a simplified diagram showing a two-dimensional barcode according to one embodiment of the present invention. This diagram is merely an example, which should not unduly limit the scope of the claims. One of ordinary skill in the art would recognize many variations, alternatives, and modifications.

According to one embodiment, the two-dimensional barcode 300 is released by a server. For example, the two-dimensional barcode 300 contains application-indication information which includes: address information of a multimedia-recording application and control information for calling the multimedia-recording application. As an example, information carried by the two-dimensional barcode 300 includes http://m.xxx.com/client/fwd?bid=default&schema=xxx&action=watermark&sourcs=qrcord&tid=morningwatermark&desc=%E6%88%90%E9%83%BD&version=1. For example, "http://m.xxx.com/client/fwd" represents the address information of the multimedia-recording application, and "schema=xxx&action=watermark" represents the control information for calling the multimedia-recording application.

According to another embodiment, the two-dimensional barcode 300 contains watermark-indication information which includes: topic information and identification information of a watermark template. As an example, "tid=morningwatermark" represents the identification information of the watermark template; and "%E6%88%90%E9%83%BD" represents a character string generated by encoding the topic information "shuiyin."

Figure 3B:
FIG. 3(B) is a simplified diagram showing application-indication information and watermark-indication information displayed on a recording interface according to one embodiment of the present invention.

FIG. 3(B) is a simplified diagram showing application-indication information and watermark-indication information displayed on a recording interface according to one embodiment of the present invention. This diagram is merely an example, which should not unduly limit the scope of the claims. One of ordinary skill in the art would recognize many variations, alternatives, and modifications.

According to one embodiment, a client scans and parses the two-dimensional barcode 300 to obtain the application-indication information and the watermark-indication information. For example, the client calls the multimedia-recording application associated with the application-indication information, generates the watermark information "Good morning, shuiyin" according to the watermark-indication information. As shown in FIG. 3(B), the generated watermark information is displayed on the recording interface of the multimedia-recording application, in some embodiments. For example, the client integrates the watermark information and the multimedia information when the multimedia information is generated on the recording interface of the multimedia-recording application.

Figure 3C:
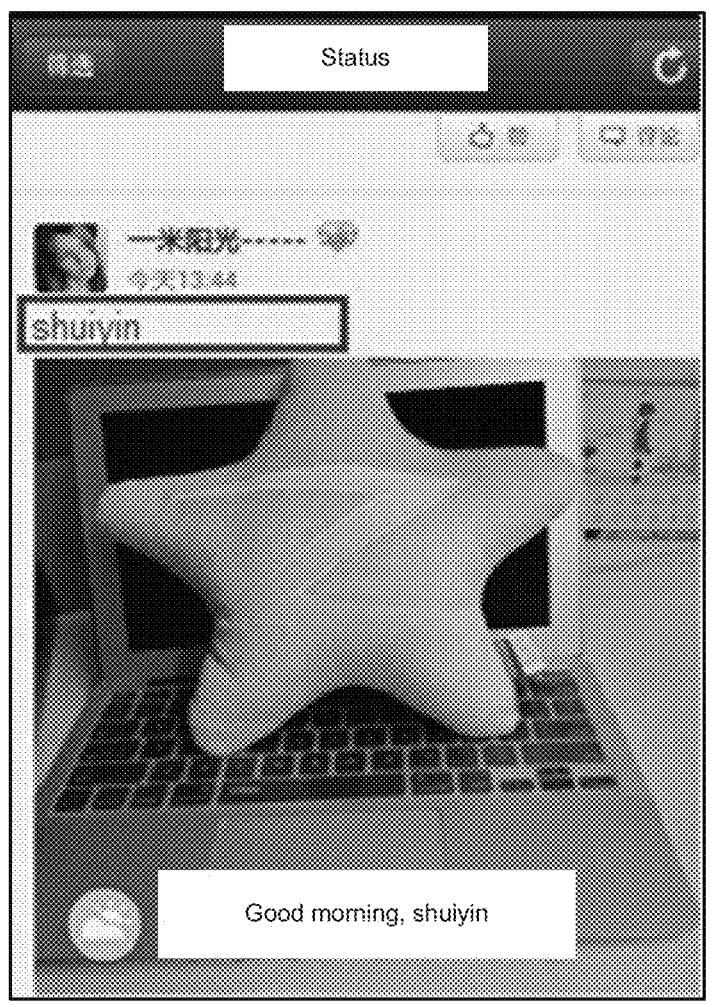
FIG. 3(C) is a simplified diagram showing topic information and multimedia information integrated with watermark information displayed on a user interface according to one embodiment of the present invention.

FIG. 3(C) is a simplified diagram showing topic information and multimedia information integrated with watermark information displayed on a user interface according to one embodiment of the present invention. This diagram is merely an example, which should not unduly limit the scope of the claims. One of ordinary skill in the art would recognize many variations, alternatives, and modifications.

According to one embodiment, when a user releases the multimedia information, the client sends the multimedia information integrated with the watermark information and the topic information to a server so that the server releases the topic information together with the multimedia information integrated with the watermark information. For example, the user can view and manage the released multimedia information and the topic information through the client.

Figure 4:
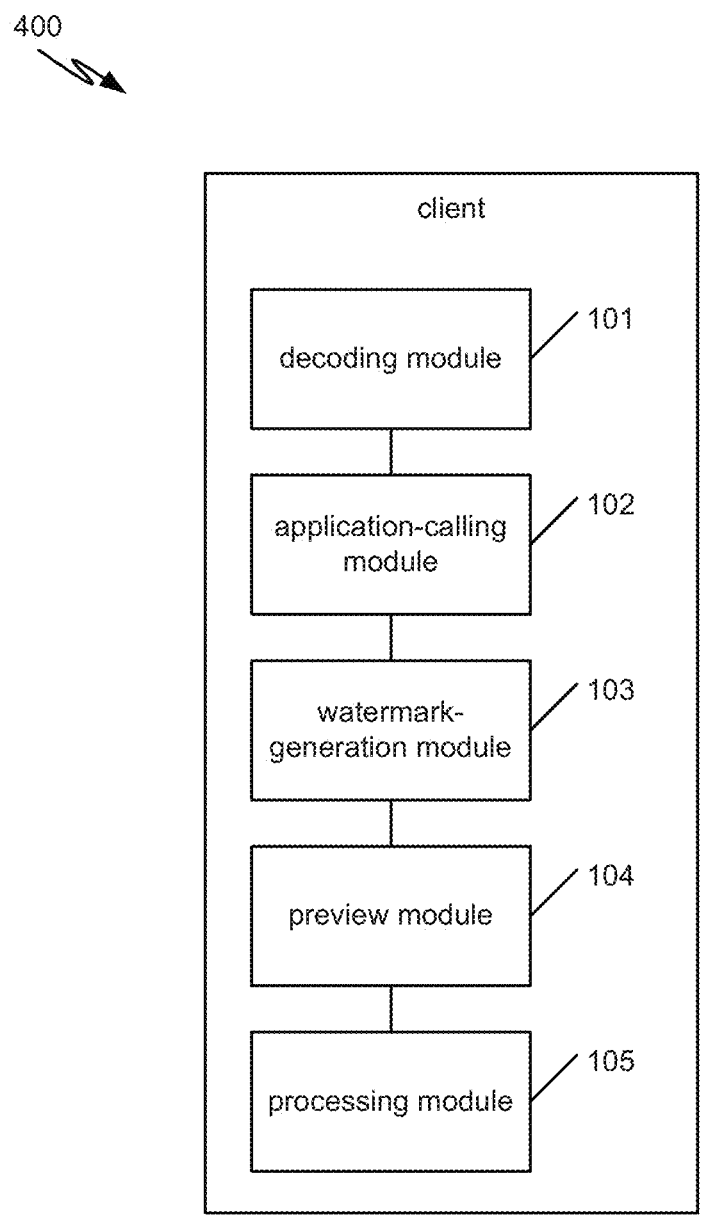
FIG. 4 is a simplified diagram showing a client for multimedia processing according to one embodiment of the present invention.

FIG. 4 is a simplified diagram showing a client for multimedia processing according to one embodiment of the present invention. This diagram is merely an example, which should not unduly limit the scope of the claims. One of ordinary skill in the art would recognize many variations, alternatives, and modifications. The client 400 includes a decoding module 101, an application-calling module 102, a watermark-generation module 103, a preview module 104 and a processing module 105.

According to one embodiment, the decoding module 101 is configured to acquire and parse an encoded file to obtain application-indication information and watermark-indication information associated with the encoded file. For example, the encoded file includes a text encoded file, e.g., a binary encoded file. In yet another example, the encoded file includes a graphic encoded file, e.g., a two-dimensional barcode. In yet another example, the application-indication information includes: address information of a multimedia-recording application and control information for calling the multimedia-recording application. In yet another example, the watermark-indication information includes: topic information and identification information of a watermark template. The decoding module 101 can use a two-dimensional barcode tool to scan and parse the two-dimensional barcode and obtain the application-indication information and watermark-indication information carried by the two-dimensional barcode, in some embodiments.

According to another embodiment, the application-calling module 102 is configured to call a multimedia-recording application associated with the application-indication information. For example, the multimedia-recording application is used to photograph or record the multimedia information. As an example, the multimedia-recording application includes: a photographing application and/or a recording application. As another example, the multimedia information includes: image information or video information. In another example, the multimedia-recording application includes a multimedia-recording application in the client or an independent multimedia application of the terminal where the client is mounted.

According to yet another embodiment, the watermark-generation module 103 is configured to generate watermark information based on at least the watermark-indication information. For example, the watermark-generation module 103 generates watermark information by using the topic information contained in the watermark-indication information and the identification information of the watermark template. In another example, the preview module 104 is configured to display the watermark information on a recording interface of the multimedia-recording application. In yet another example, the preview module 104 displays the watermark information on the recording interface of the multimedia-recording application to provide a preview of the watermark so that the user can preview, on the recording interface of the multimedia-recording application, the multimedia information which is to be recorded and contains the watermark information, in certain embodiments.

In one embodiment, the processing module 105 is configured to, in response to multimedia information being generated on the recording interface of the multimedia-recording application, integrate the watermark information and the multimedia information. For example, the multimedia information is generated on the recording interface of the multimedia-recording application after the multimedia-recording application completes the recording operation. In another example, when the multimedia application is used for photographing, the recording interface of the multimedia-recording application generates information related to the photos. In yet another example, when the multimedia application is used for videotaping, the recording interface of the multimedia-recording application generates information related to the videos. In yet another example, the processing module 105 can use multimedia integration technology to integrate the watermark information and the multimedia information. As an example, image processing software (e.g., Adobe Photoshop) may be used to overlay the watermark information on the multimedia information. As another example, the multimedia information contains the watermark information after integration.

Figure 5:
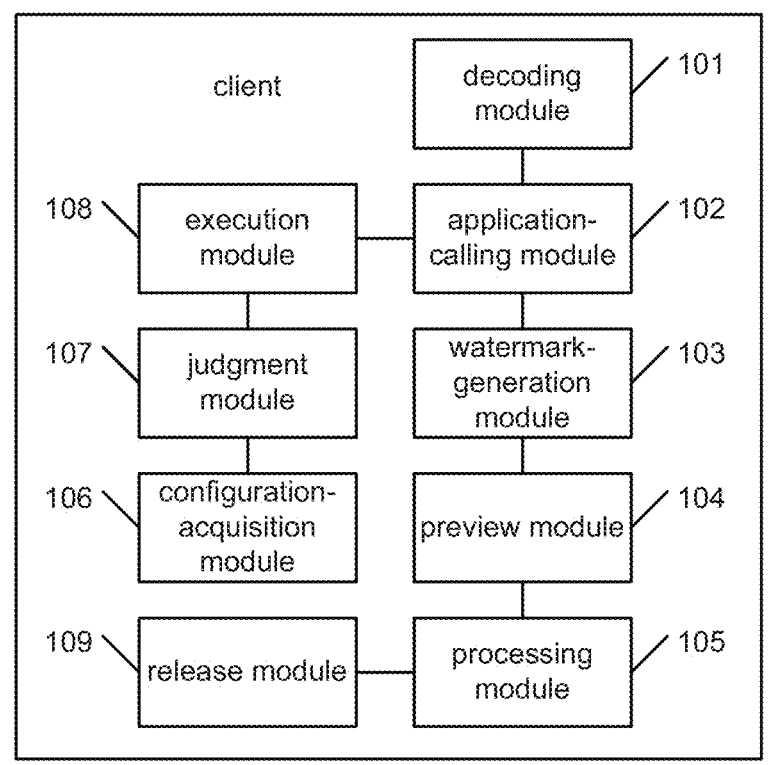
FIG. 5 is a simplified diagram showing a client for multimedia processing according to another embodiment of the present invention.

FIG. 5 is a simplified diagram showing a client for multimedia processing according to another embodiment of the present invention. This diagram is merely an example, which should not unduly limit the scope of the claims. One of ordinary skill in the art would recognize many variations, alternatives, and modifications. In addition to the decoding module 101, the application-calling module 102, the watermark-generation module 103, the preview module 104 and the processing module 105, the client 400 further includes a configuration-acquisition module 106, a judgment module 107, an execution module 108 and a release module 109.

According to one embodiment, the configuration-acquisition module 106 is configured to acquire configuration information of a current version of the client. For example, the configuration information of the current version includes: a version number, an overview of features, supported applications and an application environment of the current version. In another example, the judgment module 107 is configured to determine if the current version supports the multimedia-recording application according to the configuration information of the current version. In yet another example, if the current version supports the multimedia-recording application, it indicates that the current version of the client can call the multimedia-recording application. Otherwise, it indicates that the current version of the client cannot directly call the multimedia-recording application.

According to another embodiment, the execution module 108 is configured to, if the current version supports the multimedia-recording application, notify the application-calling module 102 to call the multimedia-recording application indicated by the application-indication information. For example, the execution module 108 is configured to, if the current version does not support the multimedia-recording application, update the current version and upon completion of the update, notify the application-calling module to call the multimedia-recording application indicated by the application-indication information.

According to yet another embodiment, the release module 109 is configured to send the multimedia information integrated with the watermark information and the topic information to a server upon receipt of a multimedia-information-release request so that the server releases the topic information together with the multimedia information integrated with the watermark information. For example, the release of the topic information includes: 1) the server releases the topic information according to a release mode set by the user (e.g., releasing the topic information regarding the user's friends on an SNS site); or 2) the server releases the topic information on a dedicated page (e.g., releasing the topic information about "Ya'an" on the dedicated page which includes all released information related to the topic "Ya'an." During the process S210, when the multimedia information is released, the topic information that matches with the watermark information is also released so as to expand release modes of the topic information, in some embodiments. For example, the user can view and manage the multimedia information and the topic information through the client after the multimedia information and the topic information is released.

Figure 6:
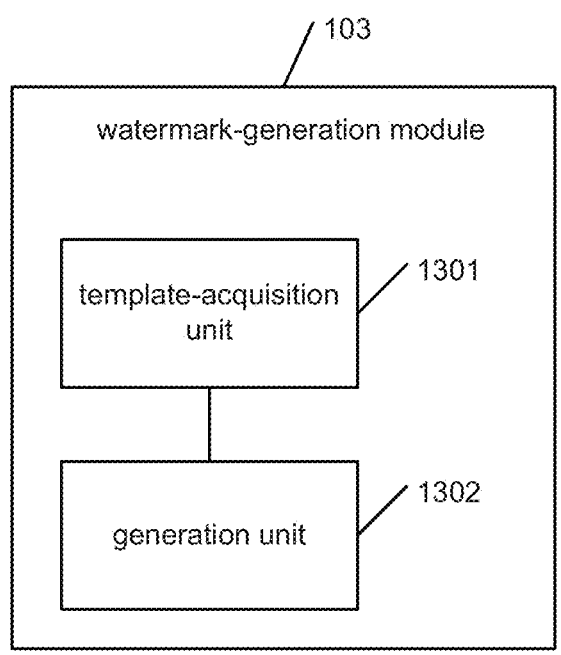
FIG. 6 is a simplified diagram showing a watermark-generation module as part of a client as shown in FIG. 4 according to one embodiment of the present invention.

FIG. 6 is a simplified diagram showing a watermark-generation module as part of the client 400 according to one embodiment of the present invention. This diagram is merely an example, which should not unduly limit the scope of the claims. One of ordinary skill in the art would recognize many variations, alternatives, and modifications. The watermark-generation module 103 includes: a template-acquisition unit 1301 and a generation unit 1302.

According to one embodiment, the template-acquisition unit 1301 is configured to acquire the watermark template associated with the identification information of the watermark template. For example, the identification information of the watermark template includes an ID of the watermark template which uniquely identifies a watermark template. In another example, the template-acquisition unit 1301 can acquire the identified watermark template from the server according to the identification information of the watermark template on a real-time basis. In yet another example, the template-acquisition unit 1301 can acquire from the server at least one watermark template in advance and then locally acquire the identified watermark template according to the identification information of the watermark template. In yet another example, the generation unit 1302 is configured to import the topic information into the watermark template to generate the watermark information. A terminal including a client that is the same as 400 as shown in FIGS. 4-6 is implemented to perform the method 100 and the method 200 as shown in FIG. 1 and FIG. 2, respectively, in some embodiments.

According to one embodiment, a method is provided for multimedia processing. For example, an encoded file is acquired; the encoded file is parsed to obtain application-indication information and watermark-indication information associated with the encoded file; a multimedia-recording application associated with the application-indication information is called; watermark information is generated based on at least the watermark-indication information; the watermark information displayed on a recording interface of the multimedia-recording application; and in response to multimedia information being generated on the recording interface of the multimedia-recording application, the watermark information and the multimedia information is integrated. For example, the method is implemented according to at least FIG. 1 and/or FIG. 2.

According to another embodiment, a client includes: a decoding module, an application-calling module, a watermark-generation module, a preview module and a processing module. The decoding module is configured to acquire and parse an encoded file to obtain application-indication information and watermark-indication information associated with the encoded file. The application-calling module is configured to call a multimedia-recording application associated with the application-indication information. The watermark-generation module is configured to generate watermark information based on at least the watermark-indication information. The preview module is configured to display the watermark information on a recording interface of the multimedia-recording application. The processing module is configured to, in response to multimedia information being generated on the recording interface of the multimedia-recording application, integrate the watermark information and the multimedia information. For example, the client is implemented according to at least FIG. 4, FIG. 5, and/or FIG. 6.

According to yet another embodiment, a terminal includes a client. The client includes: a decoding module, an application-calling module, a watermark-generation module, a preview module and a processing module. The decoding module is configured to acquire and parse an encoded file to obtain application-indication information and watermark-indication information associated with the encoded file. The application-calling module is configured to call a multimedia-recording application associated with the application-indication information. The watermark-generation module is configured to generate watermark information based on at least the watermark-indication information. The preview module is configured to display the watermark information on a recording interface of the multimedia-recording application. The processing module is configured to, in response to multimedia information being generated on the recording interface of the multimedia-recording application, integrate the watermark information and the multimedia information. For example, the terminal is implemented according to at least FIG. 4, FIG. 5, and/or FIG. 6.

According to yet another embodiment, a non-transitory computer readable storage medium includes programming instructions for multimedia processing. The programming instructions are configured to cause one or more data processors to execute certain operations. For example, an encoded file is acquired; the encoded file is parsed to obtain application-indication information and watermark-indication information associated with the encoded file; a multimedia-recording application associated with the application-indication information is called; watermark information is generated based on at least the watermark-indication information; the watermark information displayed on a recording interface of the multimedia-recording application; and in response to multimedia information being generated on the recording interface of the multimedia-recording application, the watermark information and the multimedia information is integrated. For example, the storage medium is implemented according to at least FIG. 1 and/or FIG. 2.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for multimedia processing, the method comprising:
   acquiring an encoded file;
   parsing the encoded file to obtain application-indication information and watermark-indication information associated with the encoded file, wherein the application-indication information comprises: address information associated with the multimedia-recording application and control information for calling the multimedia-recording application, and the watermark-indication information comprises: topic information and identification information of a watermark template;
   calling, using the control information, a multimedia-recording application;
   generating watermark information based on at least the watermark-indication information including the identification information of the watermark template;
   displaying a preview of the watermark information on a recording interface of the multimedia-recording application together with a preview of multimedia information to be recorded via the recording interface of the multimedia-recording application;
   subsequent to the displaying, integrating the watermark information and the multimedia information when the multimedia information is generated; and
   upon receipt of a multimedia-information-release request, sending the multimedia information integrated with the watermark information and the topic information to a server, wherein the server releases the topic information together with the multimedia information integrated with the watermark information, the topic information being used to categorize or characterize the multimedia information, and wherein the release of the topic is released on a dedicated web page that includes all released information related to a topic associated with the topic information.

2. The method of claim 1, wherein:
   the encoded file comprises a two-dimensional barcode.

3. The method of claim 1, further comprising:
   acquiring configuration information of a current version of a client;

determining whether the current version supports the multimedia-recording application based on at least the configuration information of the current version;

in response to the current version supporting the multimedia-recording application, calling the multimedia-recording application associated with the application-indication information;

in response to the current version not supporting the multimedia-recording application, updating the current version; and calling the multimedia-recording application associated with the application-indication information after the update of the current version.

4. The method of claim 1, wherein the generating watermark information based on at least the watermark-indication information comprises:

acquiring the watermark template; and importing the topic information into the watermark template to generate the watermark information.

5. A system comprising:

at least one programmable data processor; and memory storing instructions which, when executed by the at least one programmable processor, implements operations comprising:

acquiring an encoded file;

parsing the encoded file to obtain application-indication information and watermark-indication information associated with the encoded file, wherein the application-indication information comprises: address information associated with the multimedia-recording application and control information for calling the multimedia-recording application, and the watermark-indication information comprises: topic information and identification information of a watermark template;

calling, using the control information, a multimedia-recording application;

generating watermark information based on at least the watermark-indication information including the identification information of the watermark template;

displaying a preview of the watermark information on a recording interface of the multimedia-recording application together with a preview of multimedia information to be recorded via the recording interface of the multimedia-recording application;

subsequent to the displaying, integrating the watermark information and the multimedia information when the multimedia information is generated; and upon receipt of a multimedia-information-release request, sending the multimedia information integrated with the watermark information and the topic information to a server, wherein the server releases the topic information together with the multimedia information integrated with the watermark information, the topic information being used to categorize or characterize the multimedia information, and wherein the release of the topic is released on a dedicated web page that includes all released information related to a topic associated with the topic information.

6. The system of claim 5, wherein:

the encoded file comprises a two-dimensional barcode.

7. The system of claim 5, wherein the operations further comprise:

acquiring configuration information of a current version of a client;

determining whether the current version supports the multimedia-recording application based on at least the configuration information of the current version;

in response to the current version supporting the multimedia-recording application, calling the multimedia-recording application associated with the application-indication information;

in response to the current version not supporting the multimedia-recording application, updating the current version; and calling the multimedia-recording application associated with the application-indication information after the update of the current version.

8. The system of claim 5, wherein the generating watermark information based on at least the watermark-indication information comprises:

acquiring the watermark template; and importing the topic information into the watermark template to generate the watermark information.

9. A non-transitory computer-readable medium storing instructions which, when executed by at least one processor forming part of at least one computing device, result in operations comprising:

acquiring an encoded file;

parsing the encoded file to obtain application-indication information and watermark-indication information associated with the encoded file, wherein the application-indication information comprises: address information associated with the multimedia-recording application and control information for calling the multimedia-recording application, and the watermark-indication information comprises: topic information and identification information of a watermark template;

calling, using the control information, a multimedia-recording application;

generating watermark information based on at least the watermark-indication information including the identification information of the watermark template;

displaying a preview of the watermark information on a recording interface of the multimedia-recording application together with a preview of a multimedia information to be recorded via the recording interface of the multimedia-recording application;

subsequent to the displaying, integrating the watermark information and the multimedia information when the multimedia information is generated; and upon receipt of a multimedia-information-release request, sending the multimedia information integrated with the watermark information and the topic information to a server, wherein the server releases the topic information together with the multimedia information integrated with the watermark information, the topic information being used to categorize or characterize the multimedia information, and wherein the release of the topic is released on a dedicated web page that includes all released information related to a topic associated with the topic information.

10. The non-transitory computer-readable medium of claim 9, wherein:

the encoded file comprises a two-dimensional barcode.

11. The non-transitory computer-readable medium of claim 9, wherein the operations further comprise:

acquiring configuration information of a current version of a client;

determining whether the current version supports the multimedia-recording application based on at least the configuration information of the current version;

in response to the current version supporting the multimedia-recording application, calling the multimedia-recording application associated with the application-indication information;

in response to the current version not supporting the multimedia-recording application, updating the current version; and calling the multimedia-recording application associated with the application-indication information after the update of the current version.

12. The non-transitory computer-readable medium of claim 9, wherein the generating watermark information based on at least the watermark-indication information comprises:

acquiring the watermark template; and importing the topic information into the watermark template to generate the watermark information.

13. The method of claim 1, wherein the address information and/or control information is included in a uniform resource identifier.

14. The system of claim 5, wherein the address information and/or control information is included in a uniform resource identifier.

15. The non-transitory computer-readable medium of claim 9, wherein the address information and/or control information is included in a uniform resource identifier.

* * * * *